(12) United States Patent
Ando

(10) Patent No.: US 7,924,214 B2
(45) Date of Patent: Apr. 12, 2011

(54) AZIMUTH DETECTING APPARATUS AND RADAR APPARATUS

(75) Inventor: Takamasa Ando, Gifu (JP)

(73) Assignee: Denso Corporation, Kariya (JP)

( * ) Notice: Subject to any disclaimer, the term of this patent is extended or adjusted under 35 U.S.C. 154(b) by 98 days.

(21) Appl. No.: 12/455,851

(22) Filed: Jun. 8, 2009

(65) Prior Publication Data

US 2009/0303105 A1 Dec. 10, 2009

(30) Foreign Application Priority Data

Jun. 10, 2008 (JP) ................................. 2008-151668

(51) Int. Cl.
*G01S 13/42* (2006.01)
*G01S 13/93* (2006.01)

(52) U.S. Cl. .............. 342/70; 342/71; 342/72; 342/133; 342/139; 342/146; 342/147

(58) Field of Classification Search .............. 342/70–72, 342/90, 107–108, 111, 113, 116, 133, 139, 342/146–147, 156
See application file for complete search history.

(56) References Cited

U.S. PATENT DOCUMENTS

| | | | | |
|---|---|---|---|---|
| 5,361,072 A * | 11/1994 | Barrick et al. ................. 342/133 |
| 5,712,644 A | 1/1998 | Kolak |
| 6,127,963 A | 10/2000 | Schneemann |
| 6,388,631 B1 | 5/2002 | Livingston et al. |
| 7,148,840 B2 * | 12/2006 | Dooi et al. ..................... 342/131 |
| 7,545,310 B2 * | 6/2009 | Matsuoka ........................ 342/70 |
| 7,639,178 B1 * | 12/2009 | Mulbrook et al. ............. 342/146 |
| 2003/0052813 A1 * | 3/2003 | Natsume ......................... 342/70 |
| 2003/0146826 A1 | 8/2003 | Viana et al. |
| 2005/0035915 A1 | 2/2005 | Livingston et al. |
| 2005/0206556 A1 | 9/2005 | Isaji |
| 2007/0103360 A1 * | 5/2007 | Nakanishi ....................... 342/70 |
| 2008/0186223 A1 * | 8/2008 | Mayer et al. .................. 342/109 |

(Continued)

FOREIGN PATENT DOCUMENTS

JP 08-181537 7/1996

(Continued)

OTHER PUBLICATIONS

Office Action dated Apr. 13, 2010 in Japanese Application No. 2008-151668 with English translation thereof.

(Continued)

*Primary Examiner* — John B Sotomayor
(74) *Attorney, Agent, or Firm* — Harness, Dickey & Pierce, PLC

(57) ABSTRACT

In an azimuth detecting apparatus, a receiver includes antenna elements arranged at predetermined intervals d. A first signal producer produces, based on reception signals generated by the antenna elements, first signals which are equivalent to signals generated by antenna elements arranged at first intervals d1, d1 being an integral multiple of d. A second signal producer produces, based on the reception signals, second signals which are equivalent to signals generated by antenna elements arranged at second intervals d2, d2 being an integral multiple of d and greater than d1. A first azimuth detector detects, within a first azimuth detection area whose angular range is defined by d1, the azimuth of the target based on the first signals. A second azimuth detector detects, within a second azimuth detection area whose angular range is defined by d2, the azimuth of the target based on the second signals.

14 Claims, 7 Drawing Sheets

U.S. PATENT DOCUMENTS

2008/0291088 A1   11/2008   Nagai
2009/0303105 A1*  12/2009   Ando ........................... 342/123

FOREIGN PATENT DOCUMENTS

| | | |
|---|---|---|
| JP | 10-253730 | 9/1998 |
| JP | 11-002678 | 1/1999 |
| JP | 11-295407 | 10/1999 |
| JP | 2000-230974 | 8/2000 |
| JP | 2000-258524 | 9/2000 |
| JP | 2003-240832 | 8/2003 |
| JP | 2004-271189 | 9/2004 |
| JP | 2004-532546 | 10/2004 |
| JP | 2005-265779 | 9/2005 |
| JP | 2007-248480 | 9/2007 |
| JP | 2007-274686 | 10/2007 |
| JP | 2008-045880 | 2/2008 |
| WO | WO2007/083479 | 7/2007 |

OTHER PUBLICATIONS

Office Action dated Dec. 14, 2010, in corresponding Japanese Application No. 2008-151668, and English translation thereof.

* cited by examiner

CONVENTIONAL DETECTION AREA

WIDE DETECTION AREA

COMBINED DETECTION AREA

AZIMUTH DETECTING APPARATUS AND RADAR APPARATUS

CROSS-REFERENCE TO RELATED APPLICATION

This application is based on and claims priority from Japanese Patent Application No. 2008-151668, filed on Jun. 10, 2008, the content of which is hereby incorporated by reference in its entirety into this application.

BACKGROUND OF THE INVENTION

1. Technical Field of the Invention

The present invention relates to an azimuth detecting apparatus that detects the azimuth of a target by sending and receiving continuous waves, and to a radar apparatus that employs the azimuth detecting apparatus.

2. Description of the Related Art

Conventionally, a radar apparatus is installed in a motor vehicle to detect the presence of a target (for example, a roadside object such as a guardrail or a preceding vehicle) by sending and receiving continuous waves (i.e., radar waves).

More specifically, to detect the azimuth of the target and thereby determine the position of the target, the radar apparatus employs an array antenna as a receiving antenna. The array antenna is configured by, for example as disclosed in Japanese Patent First Publication No. H8-181537, arranging a plurality of antenna elements at predetermined equal intervals.

Since the radar apparatus is installed in the vehicle that usually runs at high speed, it is required for the radar apparatus to be capable of detecting the azimuth of a target present at a distant location (for example, away from the vehicle by 100 to 200 m). Further, to meet this requirement, the antenna elements are generally so arranged as to narrow the beamwidth of the array antenna (i.e., sharpen the main lobe of the array antenna).

Consequently, the angular range of an azimuth detection area of the radar apparatus becomes narrow. Here, the azimuth detection area is defined such that the radar apparatus can detect the azimuth of a target only when the target is located in the area. In addition, hereinafter, the narrow angular range is to be referred to as conventional angular range, and the azimuth detection area with the narrow angular range is to be referred to as conventional azimuth detection area. As a result, it is difficult for the radar apparatus to detect, in an early stage, another vehicle that cuts in front of the vehicle from the side.

Accordingly, it is desired for the radar apparatus to have a wider angular range of the azimuth detection area than the conventional angular range while keeping the capability of detecting the azimuth of a distant target.

To meet the above desire, one may consider configuring the receiving antenna with both a first array antenna having a plurality of antenna elements equally spaced at first intervals and a second array antenna having a plurality of antenna elements equally spaced at second intervals that are narrower than the first intervals.

However, with the above configuration, the receiving antenna would be enlarged, resulting in an increase in the manufacturing cost. On the other hand, the space in the vehicle available for installation of the radar apparatus is generally limited, and it is thus undesirable to enlarge the receiving antenna.

SUMMARY OF THE INVENTION

The present invention has been made in view of the above-mentioned problems.

According to one aspect of the present invention, there is provided an azimuth detecting apparatus which includes a transmitter, a receiver, a first signal producer, a second signal producer, a first azimuth detector, and a second azimuth detector. The transmitter transmits a continuous wave. The receiver includes a plurality of antenna elements that are arranged at predetermined intervals d. Each of the antenna elements is configured to generate a signal upon receipt of a reflected continuous wave that is produced by the reflection of the continuous wave by a target. The first signal producer produces first signals based on the signals generated by the antenna elements of the receiver. The first signals are equivalent to signals generated by a plurality of antenna elements that are arranged at first intervals d1, where d1 is an integral multiple of d. The second signal producer produces second signals based on the signals generated by the antenna elements of the receiver. The second signals are equivalent to signals generated by a plurality of antenna elements that are arranged at second intervals d2, where d2 is an integral multiple of d and greater than d1. The first azimuth detector detects, within a first azimuth detection area whose angular range is defined by d1, the azimuth of the target based on the first signals produced by the first signal producer. The second azimuth detector detects, within a second azimuth detection area whose angular range is defined by d2, the azimuth of the target based on the second signals produced by the second signal producer.

With the above configuration, the azimuth detecting apparatus can detect the azimuth of the target both within the first azimuth detection area and within the second azimuth detection area. Moreover, with d2 being greater than d1, the angular range of the first azimuth detection area is wider than the angular range of the second azimuth detection area, whereas the maximum length of the second azimuth detection area is longer than the maximum length of the first azimuth detection area.

Consequently, the azimuth detecting apparatus can detect, in an early stage, another vehicle cutting in front of the vehicle from the side as well as being able to accurately detect the azimuth of a distant object.

Furthermore, with the above configuration, it becomes possible for the azimuth detecting apparatus to detect the azimuth of the target both within the first azimuth detection area and within the second azimuth detection area without changing the predetermined intervals d between the antenna elements of the receiver and adding additional antenna elements to the receiver. In other words, it becomes possible to provide the azimuth detecting apparatus with the above capability without enlarging the receiver.

According to further implementations of the invention, the second signal producer may produce the second signals by first converting the signals generated by the antenna elements of the receiver into digital signals and then processing the digital signals.

In the array of the antenna elements of the receiver, adjacent m of the antenna elements located at one end of the array may together make up a sub-array antenna, where m is an integer greater than or equal to 2. The sub-array antenna may directly synthesize in analog form the signals generated by the m adjacent antenna elements to produce a synthetic signal. The sub-array antenna may make up part of the second signal producer to output the synthetic signal as one of the second signals. Further, the second signal producer may convert the signals generated by the antenna elements of the receiver other than the m adjacent antenna elements making up the sub-array antenna into digital signals, and synthesize every m of the digital signals to produce one of the second signals. Furthermore, d1 may be equal to d, and each of the antenna elements of the receiver other than the m adjacent antenna elements making up the sub-array antenna may make up part of the first signal producer to output the signal generated by itself as one of the first signals. In addition, m may be equal to 2, and d2 may be twice d.

In the azimuth detecting apparatus, d1 may be equal to d, and each of at least part of the antenna elements of the receiver may make up part of the first signal producer to output the signal generated by itself as one of the first signals.

According to another aspect of the present invention, there is provided a radar apparatus which includes a transmitter, a receiver, a first signal producer, a second signal producer, a first azimuth detector, a second azimuth detector, a first range detector, a second range detector, and a target identifier. The transmitter transmits a continuous wave. The receiver includes a plurality of antenna elements that are arranged at predetermined intervals d. Each of the antenna elements is configured to generate a signal upon receipt of a reflected continuous wave that is produced by the reflection of the continuous wave by a target. The first signal producer produces first signals based on the signals generated by the antenna elements of the receiver. The first signals are equivalent to signals generated by a plurality of antenna elements that are arranged at first intervals d1, where d1 is an integral multiple of d. The second signal producer produces second signals based on the signals generated by the antenna elements of the receiver. The second signals are equivalent to signals generated by a plurality of antenna elements that are arranged at second intervals d2, where d2 is an integral multiple of d and greater than d1. The first azimuth detector detects, within a first azimuth detection area whose angular range is defined by d1, the azimuth of the target based on the first signals produced by the first signal producer. The second azimuth detector detects, within a second azimuth detection area whose angular range is defined by d2, the azimuth of the target based on the second signals produced by the second signal producer. The first range detector detects the range of the target based on the first signals produced by the first signal producer. The second range detector detects the range of the target based on the second signals produced by the second signal producer. The target identifier identifies the target based on both the azimuth of the target detected by one of the first and second azimuth detectors and the range of the target detected by one of the first and second range detectors.

BRIEF DESCRIPTION OF THE DRAWINGS

The present invention will be understood more fully from the detailed description given hereinafter and from the accompanying drawings of one preferred embodiment of the invention, which, however, should not be taken to limit the invention to the specific embodiment but are for the purpose of explanation and understanding only.

In the accompanying drawings.

DESCRIPTION OF PREFERRED EMBODIMENT

Figure 1:
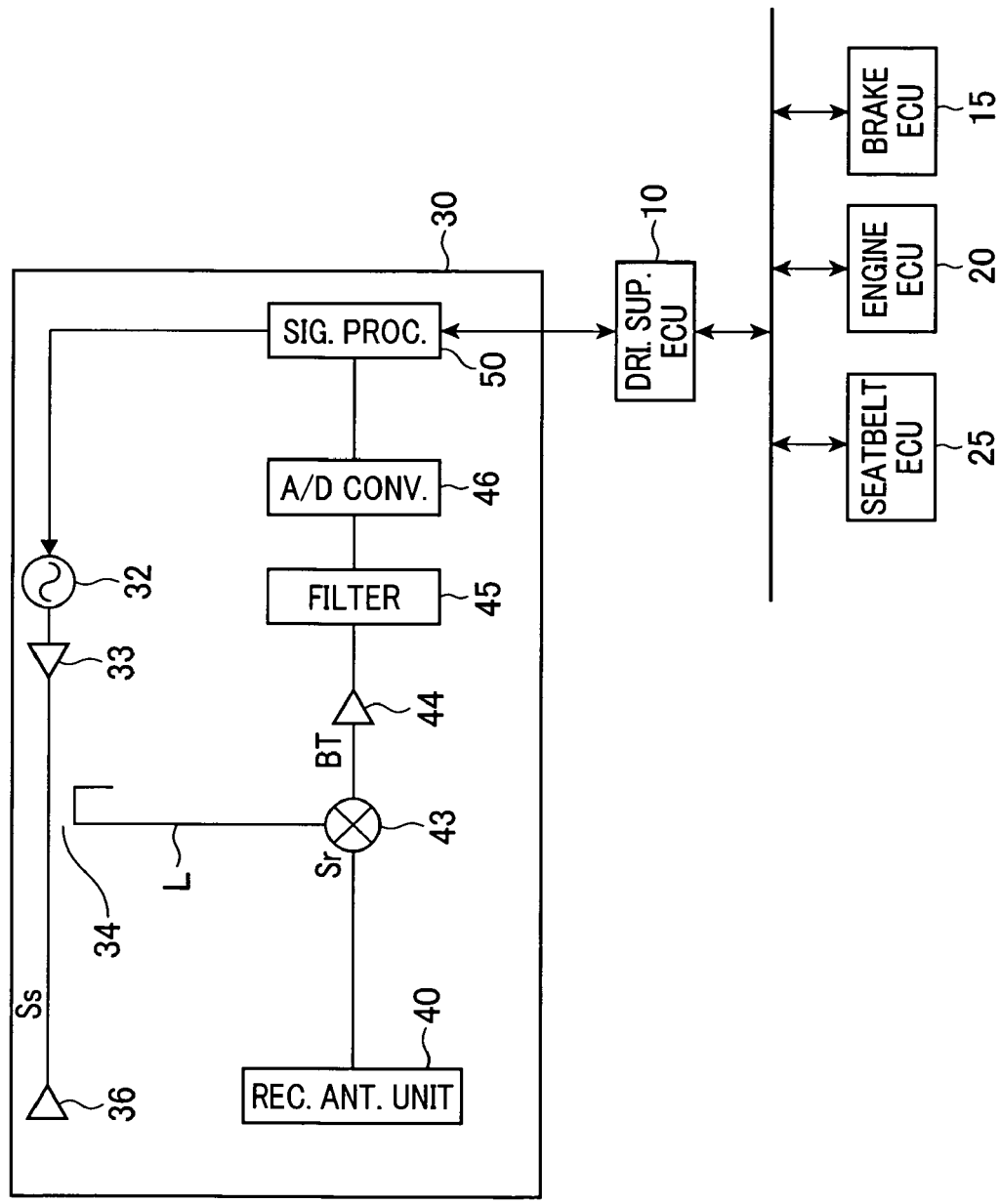
FIG. 1 is a schematic view showing the overall configuration of a driving support system which includes a radar sensor according to the preferred embodiment of the invention.

FIG. 1 shows the overall configuration of a driving support system 1 which includes a radar sensor 30 according to a preferred embodiment of the invention.

The driving support system 1 is installed in a front portion of a motor vehicle. The radar sensor 30, which detects objects present in front of the vehicle, is connected to a driving support ECU (Electronic Control Unit) 10. The driving support ECU 10 is further connected, via a LAN communication bus, to each of a brake ECU 15, an engine ECU 20, and a seatbelt ECU 25.

Each of the ECUs 10, 15, 20, and 25 is configured mainly with a microcomputer which includes a CPU, a ROM, and a RAM. Each of the ECUs 10, 15, 20, and 25 also includes a bus controller for performing communication via the LAN communication bus.

The radar sensor 30 is configured as an EHF (Extremely High Frequency) radar apparatus of FMCW (Frequency-Modulated Continuous Wave) type. The radar sensor 30 recognizes a target (e.g., a preceding vehicle or a roadside guardrail) by sending and receiving frequency-modulated continuous waves within the EHF band. Further, the radar sensor 30 produces target information on the recognized target, and outputs to the driving support ECU 10 a signal that indicates the produced target information. In addition, the target information includes, for example, the position (i.e., both the range and azimuth) of the target and the relative speed of the target to the vehicle.

The brake ECU 15 determines the state of a brake of the vehicle based on signals output from a steering angle sensor (not shown), a yaw rate sensor (not shown), and a master cylinder pressure sensor (not shown), and outputs to the driving support ECU 10 a signal that indicates the determined state of the brake. Further, the brake ECU 15 receives, from the driving support ECU 10, a signal that indicates, for example, a desired acceleration of the vehicle and a brake command. Then, based on the determined state of the brake and the signal received from the driving support ECU 10, the brake ECU 15 controls the braking force applied to the vehicle by controlling pressure-increasing and pressure-reducing valves (not shown) included in a hydraulic circuit of the vehicle.

The engine ECU 20 determines the operating condition of an engine of the vehicle based on signals output from a vehicle speed sensor (not shown), a throttle position sensor (not shown), and an accelerator position sensor (not shown), and outputs to the driving support ECU 10 a signal that indicates the determined operating condition of the engine. Further, the engine ECU 20 receives, from the driving support ECU 10, a signal that indicates, for example, the desired acceleration of the vehicle and a fuel-cut command. Then, based on the determined operating condition of the engine and the signal received from the driving support ECU 10, the engine ECU 20 controls the driving force of the engine by controlling a throttle valve of the engine.

The seatbelt ECU 25 controls, upon receipt of a warning signal from the driving support ECU 10, the restraining force of a seatbelt of the vehicle by controlling a servomotor (not shown); the warning signal warns that a collision of the vehicle with the target is inevitable.

In addition, though not shown in the drawings, a warning buzzer, a monitor, a cruise control switch, and a desired vehicle-to-vehicle distance setting switch are also connected to the driving support ECU 10.

The driving support ECU 10 performs a control for keeping a suitable distance between the vehicle and the preceding vehicle, based on the target information produced by the radar sensor 30 and parameters set by the cruise control switch and the desired vehicle-to-vehicle distance setting switch. More specifically, the driving support ECU 10 outputs to the engine ECU 20 the signal that indicates the desired acceleration and the fuel-cut command, and to the brake ECU 15 the signal that indicates the desired acceleration and the brake command.

Moreover, the driving support ECU 10 determines the probability of occurrence of a collision between the vehicle and the target based on the target information received from the radar sensor 30. When the determined probability is higher than a predetermined value, the driving support ECU 10 outputs the brake command to the brake ECU 15 to increase the braking force, and the warning signal to the seatbelt ECU 25 to increase the restraining force of the seatbelt.

That is to say, in the present embodiment, the driving support system 1 functions both as an ACC (Auto Cruise Control) system to keep a suitable distance between the vehicle and the preceding vehicle based on the target information produced by the radar sensor 30 and as a PCS (Pre-Crash Safety) system to control both the braking force and the restraining force of the seatbelt based on the target information produced by the radar sensor 30.

After having described the overall configuration of the driving support system 1, the configuration and operation of the radar sensor 30 will be described hereinafter.

The radar sensor 30 includes an oscillator 32, an amplifier 33, a signal splitter 34, a transmitting antenna 36, a receiving antenna unit 40, a mixer 43, an amplifier 44, a filter 45, an A/D (Analog-to-Digital) converter 46, and a signal processor 50.

The oscillator 32 generates an EHF signal that is frequency-modulated to have uphill intervals and downhill intervals; in the uphill intervals, the frequency of the signal increases linearly with time; in the downhill intervals, the frequency decreases linearly with time.

The amplifier 33 amplifies the EHF signal generated by the oscillator 32. The signal splitter 34 splits the EHF signal amplified by the amplifier 33 into a transmission signal Ss and a local signal L. The transmitting antenna 36 radiates a radar wave (i.e., a continuous wave) corresponding to the transmission signal Ss.

The receiving antenna unit 40 receives a radar echo (or a reflected radar wave), which is produced by the reflection of the radar wave by a target, and outputs to the mixer 43 a reception signal Sr corresponding to the received radar echo.

The mixer 43 mixes the reception signal Sr output from the receiving antenna unit 40 with the local signal L, producing a beat signal BT. The amplifier 44 amplifies the beat signal BT produced by the mixer 43. The filter 45 filters the beat signal BT amplified by the amplifier 44, thereby removing unnecessary components from the beat signal BT. The A/D converter 46 converts the beat signal BT filtered by the filter 45 into a digital signal.

The signal processor 50 is configured mainly with a microcomputer which includes a CPU, a ROM, and a RAM. The signal processor 50 controls the activation and deactivation of the oscillator 32; it also controls the conversion of the beat signal BT into the digital signal. Moreover, the signal processor 50 processes the digital signal output from the A/D converter 46, and performs a target detection process which is to be described later.

Figure 2:
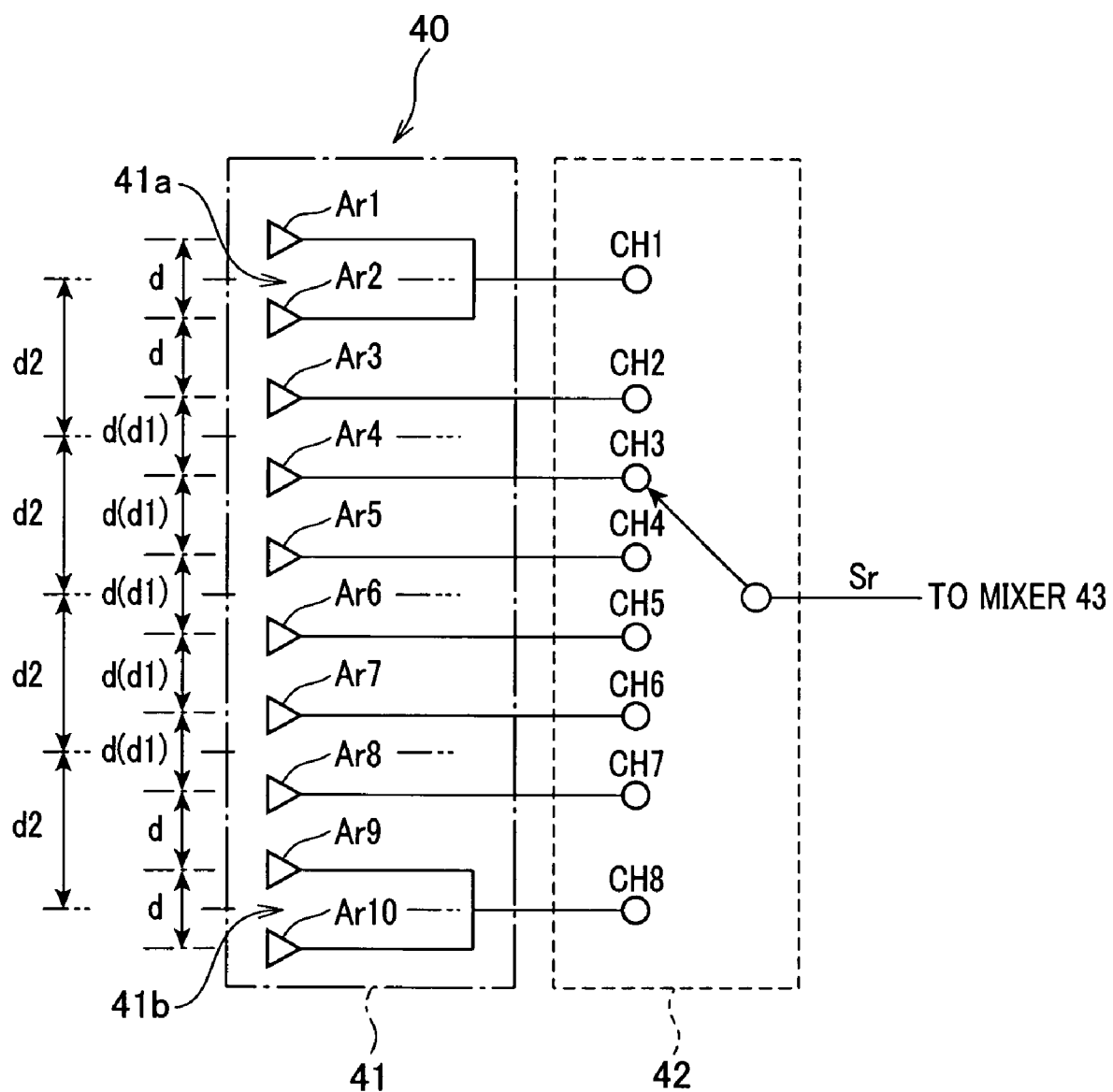
FIG. 2 is a schematic view showing the overall configuration of a receiving antenna unit of the radar sensor.

FIG. 2 shows the overall configuration of the receiving antenna unit 40 of the radar sensor 30.

The receiving antenna unit 40 includes an array antenna 41 and a reception switch 42. The array antenna 41 includes n antenna elements Ari (i=1, 2, . . . , n), where n is an integer greater than or equal to 4. In addition, in the present embodiment, n=10. Each of the antenna elements Ari is configured to generate a signal upon receipt of the radar echo. The reception switch 42 sequentially selects one or two of the antenna elements Ari at each time, and provides, as the reception signal Sr, a signal produced by the selected one or two of the antenna elements Ari to the mixer 43.

More specifically, in the present embodiment, the n antenna elements Ari of the array antenna 41 are arranged in the array direction at predetermined intervals d.

Further, among the n antenna elements Ari, the m (m is an integer greater than or equal to 2; in the present embodiment, m=2) adjacent antenna elements Ar1 through Arm (in the present embodiment, Ar1 and Ar2) located at one end of the array antenna 41 together make up a first sub-array antenna 41a; the m adjacent antenna elements Ar(n−(m−1)) through Arn (in the present embodiment, Ar9 and Ar10) located at the other end together make up a second sub-array antenna 41b.

The first sub-array antenna 41a directly synthesizes in analog form the signals generated by the antenna elements Ar1 through Arm to produce a first synthetic signal. The first sub-array antenna 41a functions as a single antenna to output the first synthetic signal to the reception switch 42.

The second sub-array antenna 41b directly synthesizes in analog form the signals generated by the antenna elements Ar(n−(m−1)) through Arn to produce a second synthetic signal. The second sub-array antenna 41b functions as a single antenna to output the second synthetic signal to the reception switch 42.

Each of the antenna elements Ar(m+1) through Ar(n−m) (in the present embodiment, Ar3 through Ar8) functions as a single antenna to output the signal generated by itself to the reception switch 42.

The reception switch 42 includes (n−2(m−1)) selectable reception channels CHj (j=1, 2, . . . , n−2(m−1)). More specifically, in the present embodiment, the reception switch 42 includes 8 reception channels CH1 through CH8. The reception channel CH1 is connected to the first sub-array antenna 41a that consists of the antenna elements Ar1 and Ar2. The reception channels CH2 through CH7 are respectively connected to the antenna elements Ar3 through Ar8. The reception channel CH 8 is connected to the second sub-array antenna 41b that consists of the antenna elements Ar9 and Ar10.

The radar sensor 30 with the above configuration operates in the following way.

First, the oscillator 32 oscillates under control of the signal processor 50, thereby generating the EHF signal. The EHF signal is then amplified by the amplifier 33, and split by the signal splitter 34 into the transmission signal Ss and the local signal L. Upon receipt of the transmission signal Ss, the transmitting antenna 36 radiates the radar wave that corresponds to the transmission signal Ss.

Further, when the radar wave is reflected by a target, the radar echo (i.e., the reflected radar wave) is transmitted back to the radar sensor 30, and received by all the antenna elements Ari (i=1, 2, ..., n). However, the reception switch 42 of the receiving antenna unit 40 sequentially selects only one of the reception channels CHj (j=1, 2, ..., n−2(m−1)) at each time. Consequently, only the signal output from that one of the first sub-array antenna 41a, the antenna elements Ar(m+1) through Ar(n−m), and the second sub-array antenna 41b which is connected to the selected channel CHj is output to the mixer 43 as the reception signal Sr. The mixer 43 mixes the reception signal Sr with the local signal L, producing the beat signal BT. The beat signal BT is then amplified by the amplifier 44, filtered by the filter 45, and converted by the A/D converter 46 into the digital signal. The digital signal is output to the signal processor 50. Then, the signal processor 50 processes the digital signal to produce the target information. Thereafter, the signal processor 50 outputs to the driving support ECU 10 the signal that indicates the produced target information.

In addition, in the present embodiment, the reception switch 42 of the receiving antenna unit 40 switches the reception channels CHj (j=1, 2, ..., n−2(m−1)) in such a manner that during each frequency-modulation cycle of the radar wave, each of the reception channels CHj is selected a predetermined number of times (e.g., 1024 times). Further, in converting the beat signal BT into the digital signal, the A/D converter 46 samples the beat signal BT in sync with the switching of the reception channels CHj by the reception switch 42. Consequently, for each of the uphill and downhill intervals in each frequency-modulation cycle of the radar wave, the beat signal BT is sampled a predetermined number of times (e.g., 512 times) for each of the reception channels CHj.

Figure 3:
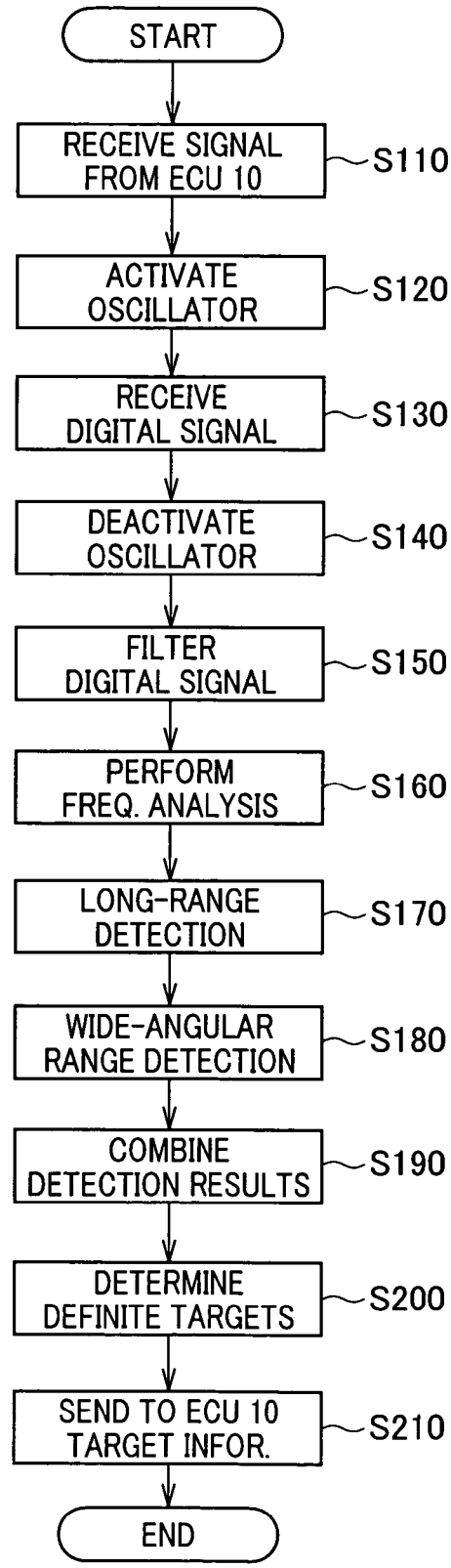
FIG. 3 is a flow chart illustrating a target detection process of a signal processor of the radar sensor.

FIG. 3 shows the target detection process of the signal processor 50. This process is started upon activation of the radar sensor 30, and repeated at predetermined time intervals. In addition, the radar sensor 30 is activated upon turning on an ignition switch of the vehicle.

First, at step S110, the signal processor 50 receives a signal from the driving support ECU 10. The signal indicates, for example, the current running speed of the vehicle and the shape of a front road (e.g., an estimated curve radius R of the front road).

At step S120, the signal processor 50 activates the oscillator 32 to start transmission of the radar wave.

At step S130, the signal processor 50 receives the digital signal output from the A/D converter 46.

At step S140, the signal processor 50 deactivates the oscillator 32 to stop the transmission of the radar wave.

At step S150, the signal processor 50 filters the digital signal with a decimation filter.

At step S160, the signal processor 50 performs a frequency analysis (more particularly, a fast Fourier transform) on the filtered digital signal to obtain a power spectrum (or frequency spectrum) of the beat signal BT for each of the reception channels CHj (j=1, 2, ..., n−2(m−1)) and for each of the uphill and downhill intervals of each frequency-modulation cycle.

Figure 4:
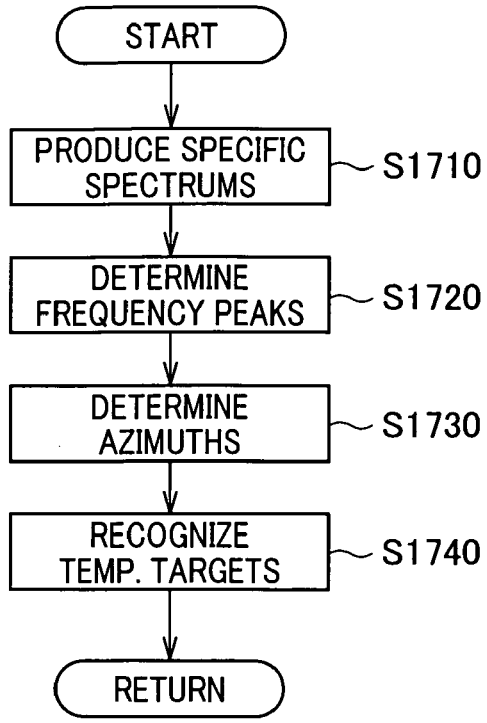
FIG. 4 is a flow chart illustrating a long-range detection sub-process of the target detection process.

At step S170, the signal processor 50 performs a long-range detection sub-process which is shown in FIG. 4.

Referring now to FIG. 4, in the long-range detection sub-process, the signal processor 50 first produces, at step S1710, specific spectrums based on the power spectrums obtained at step S160 of the main process.

More specifically, in the present embodiment, the power spectrums obtained based on the reception signal Sr output from the reception channel CH1 make up first specific spectrums; the reception channel CH1 is connected to the first sub-array antenna 41a that consists of the antenna elements Ar1 and Ar2 (see FIG. 2). The power spectrums obtained based on the reception signal Sr output from the reception channel CH2 are synthesized with those obtained based on the reception signal Sr output from the reception channel CH3 to produce second specific spectrums; the reception channels CH2 and CH3 are respectively connected to the antenna elements Ar3 and Ar4. Accordingly, the second specific spectrums can be regarded as being obtained based on a signal output from a virtual sub-array antenna that consists of the antenna elements Ar3 and Ar4. The power spectrums obtained based on the reception signal Sr output from the reception channel CH4 are synthesized with those obtained based on the reception signal Sr output from the reception channel CH5 to produce third specific spectrums; the reception channels CH4 and CH5 are respectively connected to the antenna elements Ar5 and Ar6. Accordingly, the third specific spectrums can be regarded as being obtained based on a signal output from a virtual sub-array antenna that consists of the antenna elements Ar5 and Ar6. The power spectrums obtained based on the reception signal Sr output from the reception channel CH6 are synthesized with those obtained based on the reception signal Sr output from the reception channel CH7 to produce fourth specific spectrums; the reception channels CH6 and CH7 are respectively connected to the antenna elements Ar7 and Ar8. Accordingly, the fourth specific spectrums can be regarded as being obtained based on a signal output from a virtual sub-array antenna that consists of the antenna elements Ar7 and Ar8. The power spectrums obtained based on the reception signal Sr output from the reception channel CH8 make up fifth specific spectrums; the reception channel CH8 is connected to the second sub-array antenna 41b that consists of the antenna elements Ar9 and Ar10. Consequently, the first, second, third, fourth, and fifth specific spectrums can be regarded as power spectrums obtained based on signals output from five sub-array antennas or five antenna elements that are equally spaced at second intervals d2; d2 is an integral multiple of d, and more particularly twice d (i.e., d2=2×d) in the present embodiment (see FIG. 2).

Accordingly, in a broad sense, the signal processor 50 can be regarded as a signal producer that produces, based on the signals output from all the antenna elements Ar1 through Ar10, second signals which are equivalent to signals output from five antenna elements that are equally spaced at the second intervals d2. Moreover, the specific spectrums can be regarded as power spectrums that are obtained by frequency-analyzing the second signals.

At step S1720 of FIG. 4, the signal processor 50 determines frequency peaks in the specific spectrums produced at step S1710; the frequency peaks represent the ranges to target candidates that have reflected the radar wave. In other words, at this step, the signal processor 50 detects target candidates.

Figure 7:
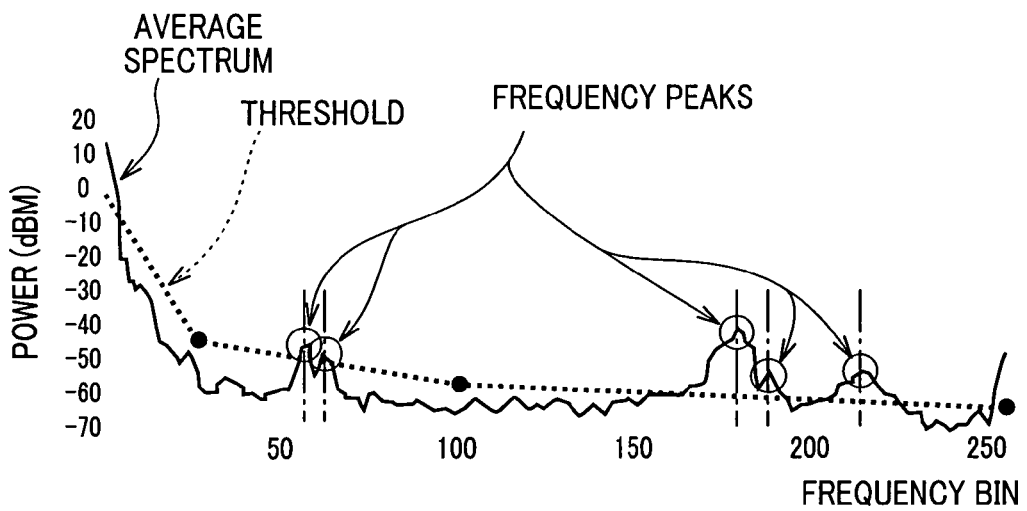
FIG. 7 is a graphical representation illustrating a step of determining frequency peaks in the long-range detection sub-process.

More specifically, in the present embodiment, the signal processor 50 first computes average spectrums by averaging the first, second, third, fourth, and fifth specific spectrums produced at step S1710. Then, the signal processor 50 determines local maximum points in the average spectrums, which exceed a predetermined threshold, as the frequency peaks. In addition, in the present embodiment, the threshold is so predetermined as to decrease with frequency. For example, FIG. 7 illustrates one of the average spectrums, where there are five local maximum points each of which exceeds the predetermined threshold and thus represents one of the frequency peaks.

At succeeding step S1730, the signal processor 50 determines, based on the specific spectrums produced at step S1710, the azimuths of the target candidates detected at step S1720.

Figure 8A:
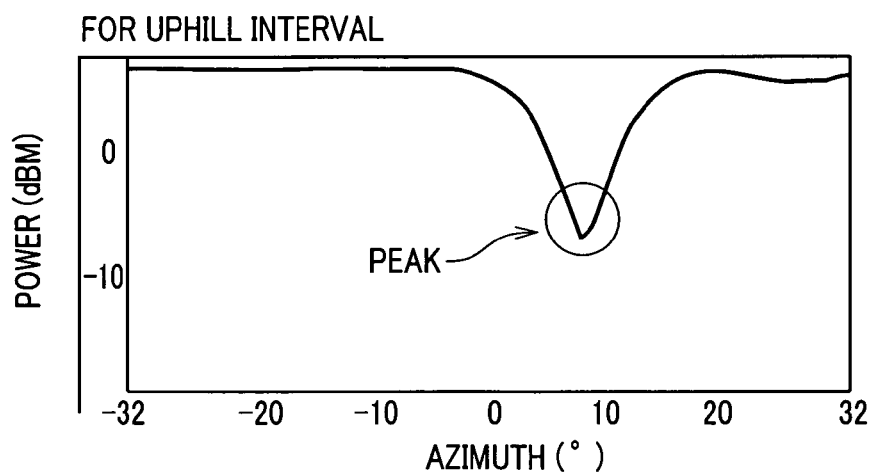
FIGS. 8A and 8B are schematic views illustrating MUSIC (Multiple Signal Classification) spectrums obtained in the long-range detection sub-process.
Figure 8B:
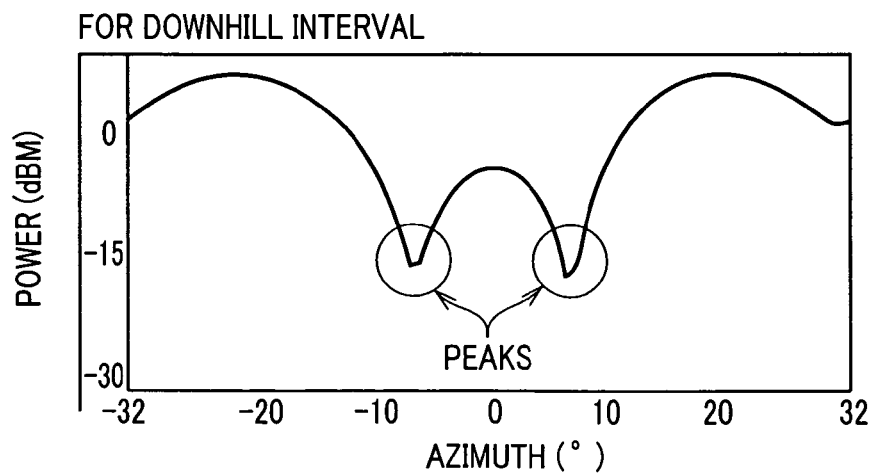

More specifically, in the present embodiment, the signal processor 50 determines the azimuths of the target candidates using a well-known MUSIC (Multiple Signal Classification) method in which MUSIC spectrums are produced from the specific spectrums. For example, FIGS. 8A and 8B respectively illustrate MUSIC spectrums produced for the uphill and downhill intervals of one frequency-modulation cycle. In addition, the peaks in the MUSIC spectrums are indicative of the azimuths of the target candidates.

At step S1740, the signal processor 50 recognizes temporary targets and produces target information on the recognized temporary targets.

More specifically, in the present embodiment, the signal processor 50 matches the frequency peaks which are determined at step S1720 based on the average spectrums for the uphill intervals of the frequency-modulation cycles with those which are determined at step S1720 based on the average spectrums for the downhill intervals of the frequency-modulation cycles. Further, the signal processor 50 determines, for each of the matched pairs of the frequency peaks, whether the differences in power and azimuth between the matched pair are within respective allowable ranges; if the result of the determination is affirmative (i.e., YES), then the signal processor 50 recognizes a temporary target which is indicated by the matched pair of the frequency peaks. Furthermore, the signal processor 50 produces target information on each of the recognized temporary targets; the target information includes both the range and azimuth of the temporary target.

Moreover, in the present embodiment, the second intervals d2 are so predetermined as to be identical to intervals at which antenna elements of a conventional radar sensor are arranged.

Figure 6A:
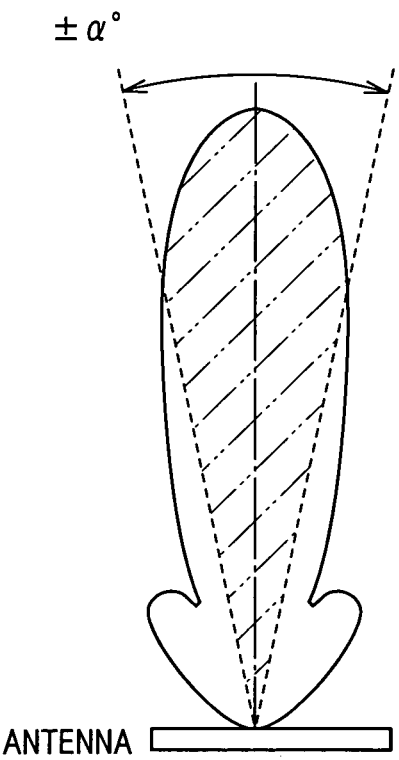
FIG. 6A is a schematic view illustrating a conventional azimuth detection area.

Consequently, as shown in FIG. 6A, by performing the long-range detection sub-process, the azimuth detection area of the radar sensor 30 becomes identical to the conventional azimuth detection area, and the angular range of the azimuth detection area (designated by ±α° in FIG. 6A) becomes identical to the conventional angular range. As a result, it is possible for the radar sensor 30 to detect a target at a long range from the vehicle.

Figure 5:
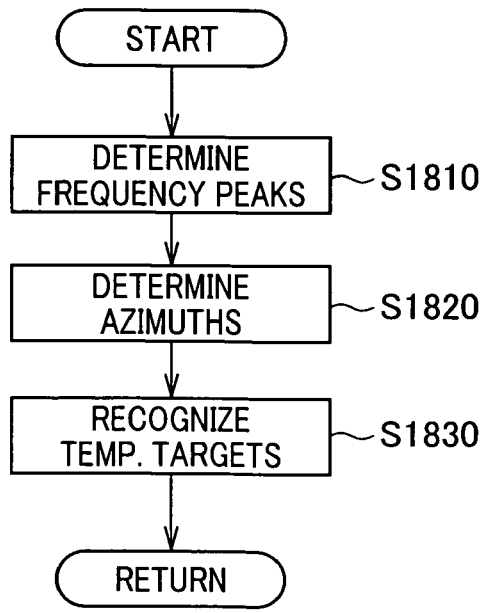
FIG. 5 is a flow chart illustrating a wide-angular range detection sub-process of the target detection process.

Returning to the main process (i.e., the target detection process) shown in FIG. 3, at step S180, the signal processor 50 performs a wide-angular range detection sub-process which is shown in FIG. 5.

Referring now to FIG. 5, at step S1810 of the wide-angular range detection sub-process, the signal processor 50 first selects part of all the power spectrums obtained at step S160 of the main process as wide-angular range spectrums; then, the signal processor 50 determines frequency peaks in the wide-angular range spectrums; the frequency peaks represent the ranges to target candidates that have reflected the radar wave. In other words, at this step, the signal processor 50 detects target candidates.

More specifically, in the present embodiment, among all the power spectrums obtained at step S160 of the main process, the signal processor 50 selects only those power spectrums which are obtained based on the reception signals Sr output from the reception channels CH2 through CH7 as the wide-angular range spectrums; the reception channels CH2 through CH7 are respectively connected to the antenna elements Ar3 through Ar8 that are equally spaced at the predetermined intervals d. Further, the signal processor 50 computes average wide-angular range spectrums by averaging all the wide-angular range spectrums. Then, the signal processor 50 determines local maximum points in the average wide-angular range spectrums, which exceed a predetermined threshold, as the frequency peaks.

Accordingly, in a broad sense, the signal processor 50 can be regarded as a signal producer that produces, based on the signals output from all the antenna elements Ar1 through Ar10, first signals which are equivalent to signals output from six antenna elements that are equally spaced at first intervals d1; d1 is an integral multiple of d and less than d2, and more particularly equal to d (i.e., d1=d) in the present embodiment. Moreover, the wide-angular range spectrums can be regarded as power spectrums that are obtained by frequency-analyzing the first signals.

At step S1820 of FIG. 5, the signal processor 50 determines, based on the wide-angular range spectrums obtained at step S1810, the azimuths of the target candidates detected at step S1810.

In addition, in the present embodiment, the signal processor 50 determines the azimuths of the target candidates using a well-known DBF (Digital Beam Forming) method.

At step S1830, the signal processor 50 recognizes temporary targets and produces target information on the recognized temporary targets.

More specifically, in the present embodiment, the signal processor 50 matches the frequency peaks which are determined at step S1810 based on the wide-angular range spectrums for the uphill intervals of the frequency-modulation cycles with those which are determined at step S1810 based on the wide-angular range spectrums for the downhill intervals of the frequency-modulation cycles. Further, the signal processor 50 determines, for each of the matched pairs of the frequency peaks, whether the differences in power and azimuth between the matched pair are within respective allowable ranges; if the result of the determination is affirmative (i.e., YES), then the signal processor 50 recognizes a temporary target which is indicated by the matched pair of the frequency peaks. Furthermore, the signal processor 50 produces target information on each of the recognized temporary targets; the target information includes both the range and azimuth of the temporary target.

Figure 6B:
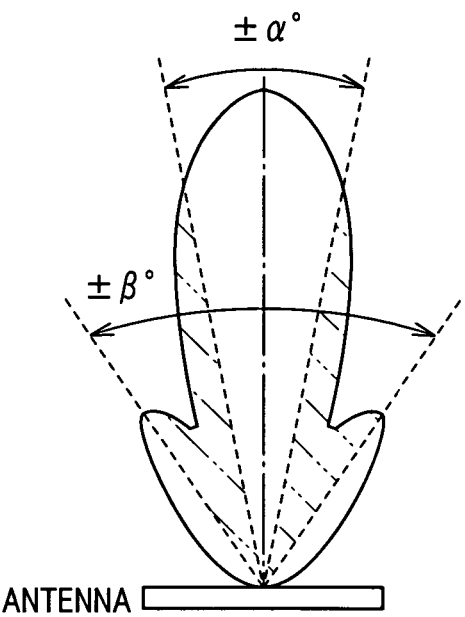
FIG. 6B is a schematic view illustrating a wide azimuth detection area of the radar sensor.

Moreover, in the present embodiment, d1 (or d) is half d2. Consequently, as shown in FIG. 6B, by performing the wide-angular range detection sub-process, the maximum length of the azimuth detection area of the radar sensor 30 becomes shorter than that of the conventional azimuth detection area; however, the angular range of the azimuth detection area (designated by ±β° in FIG. 6B) becomes considerably wider than the conventional angular range (i.e., β>α). In addition, the azimuth detection area with the wider angular range is to be referred to as wide azimuth detection area hereinafter.

Returning to the main process (i.e., the target detection process) shown in FIG. 3, at step S190, the signal processor 50 combines the results of the long-range detection sub-process with those of the wide-angular range detection sub-process.

Figure 6C:
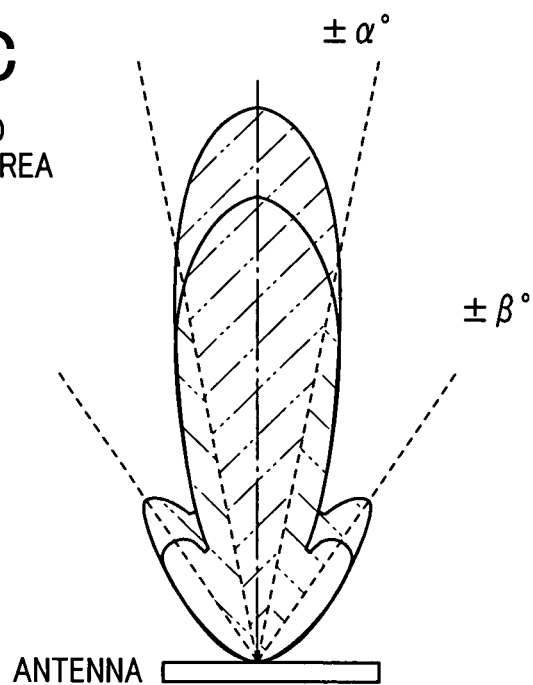
FIG. 6C is a schematic view illustrating a combined azimuth detection area which is the union of the conventional azimuth detection area and the wide azimuth detection area.

More specifically, in the present embodiment, the signal processor 50 superposes the wide azimuth detection area shown in FIG. 6B on the conventional azimuth detection area shown in FIG. 6A, obtaining a combined azimuth detection area as shown in FIG. 6C. Here, the combined azimuth detection area represents the union of the conventional azimuth detection area and the wide azimuth detection area. Further, among the set of the temporary targets recognized by the wide-angular range detection sub-process, the signal processor 50 adds only those temporary targets which fall out of the intersection of the wide and conventional azimuth detection areas to the set of the temporary targets recognized by the long-range detection sub-process, resulting in a combined set of the temporary targets. Here, the combined set of the temporary targets represents the union of the set of the temporary targets recognized by the long-range detection sub-process and the set of the temporary targets recognized by the wide-angular range detection sub-process.

At succeeding step S200, the signal processor 50 determines definite targets among the combined set of the temporary targets.

More specifically, in the present embodiment, the signal processor 50 first matches the combined set of the temporary targets obtained in the current cycle of the repeated executions of the target detection process with that obtained in the previous cycle. Then, for each matched pair of the temporary targets, the signal processor 50 estimates, based on the target information on the temporary target recognized in the previous cycle, both the position and relative speed of the temporary target in the current cycle; further, when the difference between the estimated position and the actual position of the temporary target recognized in the current cycle and the difference between the estimated relative speed and the actual relative speed of the temporary target recognized in the current cycle are less than respective upper limits, the signal process 50 determines that the matched pair of the temporary targets have a historical connection. Furthermore, the signal processor 50 determines, for each of the combined set of the temporary targets recognized in the current cycle, whether the temporary target has kept the historical connection over more than a predetermined number of consecutive cycles; if the result of the determination is affirmative (i.e., YES), then the signal processor 50 determines the temporary target as a definite target.

Figure 9:
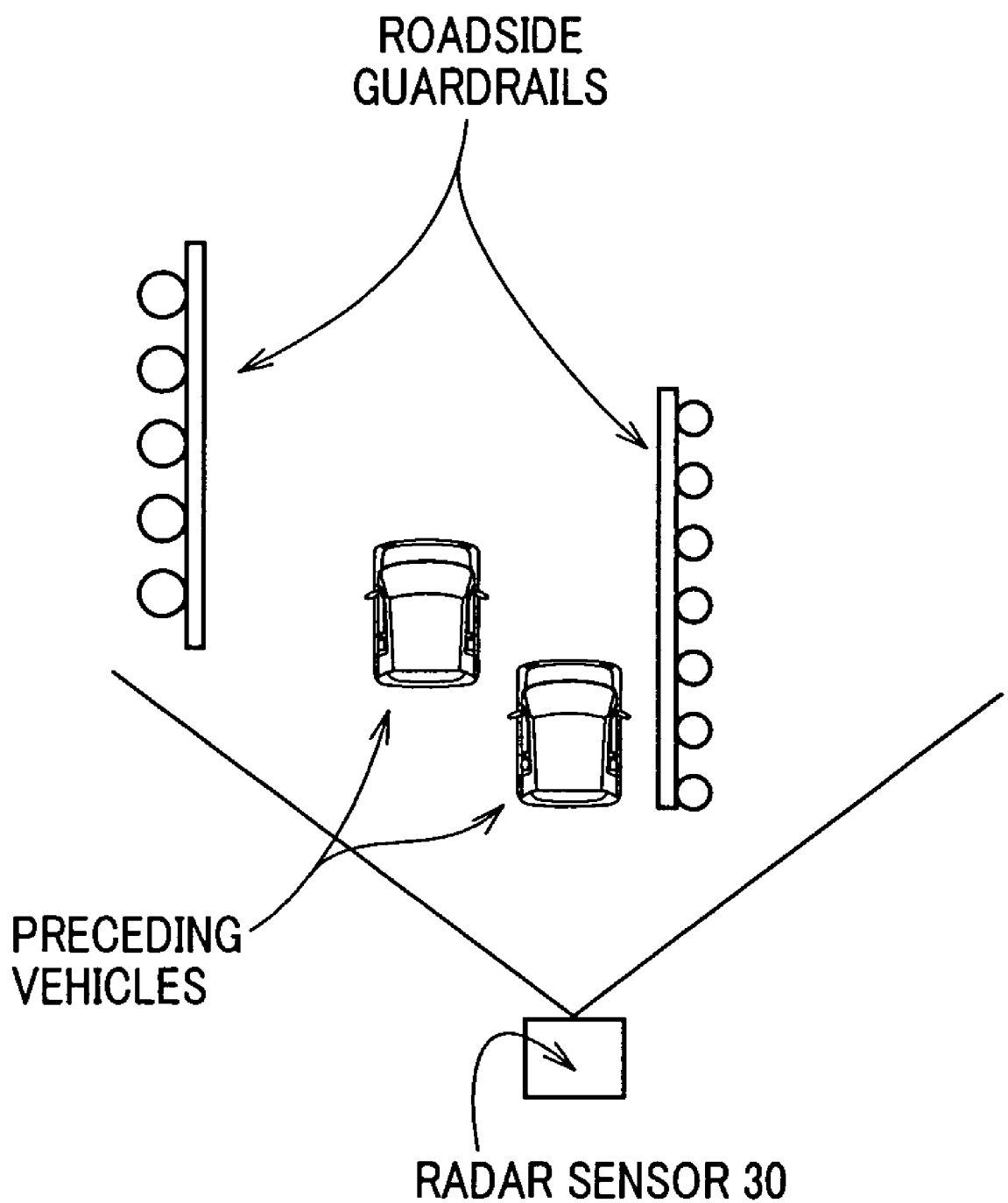
FIG. 9 is a schematic view illustrating objects identified by the radar sensor.

In addition, at this step, the signal processor 50 further identifies, based on the positions and relative speeds of the definite targets, objects present within the combined azimuth detection area, for example roadside guardrails and preceding vehicles as illustrated in FIG. 9.

At step S210, the signal processor 50 sends the target information on the definite targets to the driving support ECU 10.

After that, the target detection process goes to the end. In other words, the signal processor 50 completes the current cycle of repeating the target detection process.

As described above, in the radar sensor 30 according to the present embodiment, the receiving antenna unit 40 includes the plurality of antenna elements Ari (i=1, 2, . . . , n) that are arranged at the predetermined intervals d.

The signal processor 50 produces the specific spectrums based on the signals generated by the antenna elements Ari. The specific spectrums are equivalent to power spectrums each of which is produced by frequency-analyzing a signal output from one of a plurality of antenna elements that are arranged at the second intervals $d2$; $d2$ is an integral multiple of d, and more particularly twice d (i.e., $d2=2\times d$) in the present embodiment. The signal processor 50 determines, based on the specific spectrums, the azimuths and ranges of temporary targets within the conventional azimuth detection area whose angular range (i.e., $\pm\alpha°$ in FIG. 6A) is defined by $d2$.

In other words, the signal processor 50 produces second signals based on the signals generated by the antenna elements Ari; the second signals are equivalent to signals generated by a plurality of antenna elements that are arranged at the second intervals $d2$; the signal processor 50 determines, based on the second signals, the azimuths and ranges of temporary targets within the conventional azimuth detection area.

Moreover, the signal processor 50 produces the wide-angular range spectrums based on the signals generated by the antenna elements Ari. The wide-angular range spectrums are equivalent to power spectrums each of which is produced by frequency-analyzing a signal output from one of a plurality of antenna elements that are arranged at the first intervals $d1$; $d1$ is an integral multiple of d and less than $d2$, and more particularly equal to d (i.e., $d1=d$) in the present embodiment. The signal processor 50 determines, based on the wide-angular range spectrums, the azimuths and ranges of temporary targets within the wide azimuth detection are whose angular range (i.e., $\pm\beta°$ in FIG. 6B) is defined by $d1$.

In other words, the signal processor 50 produces first signals based on the signals generated by the antenna elements Ari; the first signals are equivalent to signals generated by a plurality of antenna elements that are arranged at the first intervals $d1$; the signal processor 50 determines, based on the first signals, the azimuths and ranges of temporary targets within the wide azimuth detection area.

Further, the signal processor 50 combines the set of the temporary targets recognized by the long-range detection sub-process with the set of the temporary targets recognized by the wide-angular range detection sub-process, determines the definite targets among the combined set of the temporary targets, and identifies objects within the combined azimuth detection area based on the positions and relative speeds of the definite targets.

With the above configuration, the radar sensor 30 can detect targets within the wide azimuth detection area as well as within the conventional azimuth detection area. The angular range of the wide azimuth detection area is wider than the angular range of the conventional azimuth detection area, whereas the maximum length of the conventional azimuth detection area is longer than the maximum length of the wide azimuth detection area. Consequently, the radar sensor 30 can detect, in an early stage, another vehicle cutting in front of the vehicle from the side as well as being able to accurately detect the position of a distant target.

Furthermore, with the above configuration, it becomes possible for the radar sensor 30 to detect targets both within the wide azimuth detection area and within the conventional azimuth detection area without changing the predetermined intervals d between the antenna elements Ari and adding additional antenna elements to the receiving antenna unit 40. In other words, it becomes possible to provide the radar sensor 30 with the above capability without enlarging the receiving antenna unit 40.

Moreover, in the radar sensor 30, the signal processor 50 produces the second through fourth specific spectrums by first converting the signals generated by the antenna elements Ar3 through Ar8 into the respective digital signals and then processing the digital signals.

In other words, the signal processor 50 can easily produce the second signals without changing the mechanical configuration of the receiving antenna unit 40.

In the receiving antenna unit 40, the antenna elements Ar1 and Ar2 located at one end of the array antenna 41 together make up the first sub-array antenna 41a; the antenna elements A9 and A10 located at the other end of the array antenna 41 together make up the second sub-array antenna 41b. The first sub-array antenna 41a directly synthesizes in analog form the signals generated by antenna elements Ar1 and Ar2 to produce the first synthetic signal, based on which the first specific spectrums are further produced. The second sub-array antenna 41b directly synthesizes in analog form the signals generated by the antenna elements A9 and A10 to produce the second synthetic signal, based on which the second specific spectrums are further produced.

With the above configuration, the number of the reception channels CHj is reduced from n (i.e., 10) to (n−2(m−1)) (i.e., 8), thereby downsizing the receiving antenna unit 40.

In the receiving antenna unit 40, d1=d. The signals generated by the antenna elements Ar3 through Ar8 are separately processed, without being synthesized with one another, to produce the wide-angular range spectrums.

In other words, each of the antenna elements Ar3 through Ar8 outputs the signal generated by itself as one of the first signals.

With the above configuration, the process of producing the wide-angular range spectrums (in other words, the first signals) is simplified, improving the efficiency of the signal processor 50.

While the above particular embodiment of the invention has been shown and described, it will be understood by those skilled in the art that various modifications, changes, and improvements may be made without departing from the spirit of the invention.

For example, in the previous embodiment, the array antenna 41 of the receiving antenna unit 40 includes the first and second sub-array antennas 41 and 41b that are respectively located at opposite ends of the array antenna 41. However, it is also possible to locate both the first and second sub-array antennas 41a and 41b at the same end of the array antenna 41. Further, the array antenna 41 may also be configured to include only one of the first and second sub-array antennas 41a 41b, omitting the other. Furthermore, it is also possible to configure the array antenna 41 to include no sub-array antenna, so that each of all the signals generated by the antenna elements Ari (i=1, 2, . . . , n) is directly output from the receiving antenna unit 40 without being synthesized in analog form with another signal.

In the previous embodiment, m is equal to 2 and d2=2×d, so that each of the first and second sub-array antennas 41a and 41b includes adjacent two of the antenna elements, and every two of the power spectrums produced based respectively on the signals generated by adjacent two of the antenna elements are synthesized to produce one of the specific spectrums. However, m may also be other integers greater than 2 (e.g., 3 or 4) as long as d2=m×d.

In the previous embodiment, n=10 and m=2. However, n and m may be other integers; for example, n=12 and m=3.

In the previous embodiment, d1=d. However, d1 may be an integral multiple of d greater than d (for example, d1=2×d), as long as d1<d2.

In the previous embodiment, the MUSIC method is used in the long-range detection sub-process to determine the azimuths of the target candidates. However, instead of the MUSIC method, it is also possible to use other methods, such as the DBF method.

In the previous embodiment, the DBF method is used in the wide-angular range detection sub-process to determine the azimuths of the target candidates. However, instead of the DBF method, it is also possible to use other methods, such as the MUSIC method.

In the previous embodiment, the present invention is applied to the radar sensor 30 which is employed in the driving support system 1 that functions both as an ACC (Auto Cruise Control) system and a PCS (Pre-Crash Safety) system. However, the present invention may also be applied to any other radar apparatus employed in any other vehicle safety system, such as a FCW (Forward Collision Warning) system or LCW (Lane Change Warning) system.

What is claimed is:

1. An azimuth detecting apparatus comprising:
   a transmitter that transmits a continuous wave;
   a receiver including a plurality of antenna elements that are arranged at predetermined intervals d, each of the antenna elements being configured to generate a signal upon receipt of a reflected continuous wave that is produced by the reflection of the continuous wave by a target;
   a first signal producer that produces first signals based on the signals generated by the antenna elements of the receiver, the first signals being equivalent to signals generated by a plurality of antenna elements that are arranged at first intervals d1, where d1 is an integral multiple of d;
   a second signal producer that produces second signals based on the signals generated by the antenna elements of the receiver, the second signals being equivalent to signals generated by a plurality of antenna elements that are arranged at second intervals d2, where d2 is an integral multiple of d and greater than d1;
   a first azimuth detector that detects, within a first azimuth detection area whose angular range is defined by d1, the azimuth of the target based on the first signals produced by the first signal producer; and
   a second azimuth detector that detects, within a second azimuth detection area whose angular range is defined by d2, the azimuth of the target based on the second signals produced by the second signal producer.

2. The azimuth detecting apparatus as set forth in claim 1, wherein the second signal producer produces the second signals by first converting the signals generated by the antenna elements of the receiver into digital signals and then processing the digital signals.

3. The azimuth detecting apparatus as set forth in claim 1, wherein in an array of the antenna elements of the receiver, adjacent m of the antenna elements located at one end of the array together make up a sub-array antenna, where m is an integer greater than or equal to 2,
   the sub-array antenna directly synthesizes in analog form the signals generated by the m adjacent antenna elements to produce a synthetic signal, and
   the sub-array antenna makes up part of the second signal producer to output the synthetic signal as one of the second signals.

4. The azimuth detecting apparatus as set forth in claim 3, wherein the second signal producer converts the signals generated by the antenna elements of the receiver other than the m adjacent antenna elements making up the sub-array antenna into digital signals, and synthesizes every m of the digital signals to produce one of the second signals.

5. The azimuth detecting apparatus as set forth in claim 4, wherein d1=d, and
   each of the antenna elements of the receiver other than the m adjacent antenna elements making up the sub-array antenna makes up part of the first signal producer to output the signal generated by itself as one of the first signals.

6. The azimuth detecting apparatus as set forth in claim 5, wherein m=2, and d2=2×d.

7. The azimuth detecting apparatus as set forth in claim 1, wherein d1=d, and
   each of at least part of the antenna elements of the receiver makes up part of the first signal producer to output the signal generated by itself as one of the first signals.

8. A radar apparatus comprising:

a transmitter that transmits a continuous wave;

a receiver including a plurality of antenna elements that are arranged at predetermined intervals d, each of the antenna elements being configured to generate a signal upon receipt of a reflected continuous wave that is produced by the reflection of the continuous wave by a target;

a first signal producer that produces first signals based on the signals generated by the antenna elements of the receiver, the first signals being equivalent to signals generated by a plurality of antenna elements that are arranged at first intervals d1, where d1 is an integral multiple of d;

a second signal producer that produces second signals based on the signals generated by the antenna elements of the receiver, the second signals being equivalent to signals generated by a plurality of antenna elements that are arranged at second intervals d2, where d2 is an integral multiple of d and greater than d1;

a first azimuth detector that detects, within a first azimuth detection area whose angular range is defined by d1, the azimuth of the target based on the first signals produced by the first signal producer;

a second azimuth detector that detects, within a second azimuth detection area whose angular range is defined by d2, the azimuth of the target based on the second signals produced by the second signal producer;

a first range detector that detects the range of the target based on the first signals produced by the first signal producer;

a second range detector that detects the range of the target based on the second signals produced by the second signal producer; and a target identifier that identifies the target based on both the azimuth of the target detected by one of the first and second azimuth detectors and the range of the target detected by one of the first and second range detectors.

9. The radar apparatus as set forth in claim 8, wherein the second signal producer produces the second signals by first converting the signals generated by the antenna elements of the receiver into digital signals and then processing the digital signals.

10. The radar apparatus as set forth in claim 8, wherein in an array of the antenna elements of the receiver, adjacent m of the antenna elements located at one end of the array together make up a sub-array antenna, where m is an integer greater than or equal to 2, the sub-array antenna directly synthesizes in analog form the signals generated by the m adjacent antenna elements to produce a synthetic signal, and the sub-array antenna makes up part of the second signal producer to output the synthetic signal as one of the second signals.

11. The radar apparatus as set forth in claim 10, wherein the second signal producer converts the signals generated by the antenna elements of the receiver other than the m adjacent antenna elements making up the sub-array antenna into digital signals, and synthesizes every m of the digital signals to produce one of the second signals.

12. The radar apparatus as set forth in claim 11, wherein d1=d, and each of the antenna elements of the receiver other than the m adjacent antenna elements making up the sub-array antenna makes up part of the first signal producer to output the signal generated by itself as one of the first signals.

13. The radar apparatus as set forth in claim 12, wherein m=2, and d2=2×d.

14. The radar apparatus as set forth in claim 8, wherein d1=d, and each of at least part of the antenna elements of the receiver makes up part of the first signal producer to output the signal generated by itself as one of the first signals.

* * * * *